US005530547A

United States Patent [19]
Arnold

[11] Patent Number: 5,530,547
[45] Date of Patent: Jun. 25, 1996

[54] METHOD AND APPARATUS FOR ALIGNING OPTICAL ELEMENTS AND TESTING ASPHERIC OPTICAL COMPONENTS

[76] Inventor: Steven M. Arnold, 2920 Minnehaha Curve, Minnetonka, Minn. 55391

[21] Appl. No.: 286,011

[22] Filed: Aug. 4, 1994

[51] Int. Cl.$^6$ ...................................................... G01B 9/02
[52] U.S. Cl. ........................ 356/354; 359/818; 359/819; 359/827
[58] Field of Search ................................... 356/345, 354; 359/818, 819, 827

[56] References Cited

U.S. PATENT DOCUMENTS

| 4,281,895 | 8/1981 | Mohr | 359/827 |
|---|---|---|---|
| 5,097,280 | 3/1992 | Nomura | 359/819 |
| 5,140,470 | 8/1992 | Luecke | 35/818 |

OTHER PUBLICATIONS

"An interferometer for testing of general aspherics using computer generated holograms", by Steven M. Arnold and Anil K. Jain, vol. 1396, 27–28 Sep. 1990.
Diffraction International, "CGH Null Adaptor", 1993, Bulletin 1300.
Diffraction International, "CGH Photomasks", 1993.
Diffraction International, "Binary Optics", 1993, Bulletin 1100.
Diffraction International, "CGH Frames And Mounts," Bulletin 1200.
APA Optics, "Interferometer for aspheric Testing Using Computer Generated Holograms," Jan. 1992.

*Primary Examiner*—Samuel A. Turner
*Assistant Examiner*—Robert Kim
*Attorney, Agent, or Firm*—Westman, Champlin & Kelly

[57] ABSTRACT

The present invention is directed to an apparatus for aligning optical elements and a method used to test aspheric components using a conventional interferometer. The apparatus comprises an optical mount having a base and a mount plate used for adjustably mounting an optical element. The mount plate is adjustable relative to the base and includes an assembly surface and several side surfaces. The base is attachable to a bench, table, rail, or the like. An optical element, such as a pre-aligned alignment CGH, is positioned within a first frame, which in turn is releasably coupled to the mount plate. The interferometer generates a spherical test beam which is diffracted by the reflective alignment CGH to create an interferogram. The mount plate is adjusted relative to the base to diffract the test beam onto itself, thus producing null interference fringes. The alignment CGH is removed from the mount plate and a second optical element, such as a CGH null compensator fixed to a second frame, is releasably coupled to the mount plate in place of the alignment CGH, without adjusting the position of the mount plate, such that the spherical test beam from the interferometer is diffracted as it passes through the CGH null compensator to form a prescribed aspheric wavefront for testing aspheric components.

27 Claims, 7 Drawing Sheets

METHOD AND APPARATUS FOR ALIGNING OPTICAL ELEMENTS AND TESTING ASPHERIC OPTICAL COMPONENTS

BACKGROUND OF THE INVENTION

The present invention relates to a method and apparatus for adjustably mounting optical elements. More particularly, the present invention relates to the testing of aspheric optical components by using interchangeable computer generated holograms (CGH) releasably coupled to an optical mount.

Laser interferometers provide the standard means for precision figure metrology of optical components and the transmission testing of optical assemblies. Accessory optics, such as Fizeau transmission spheres, produce spherical test light beams required by most testing configurations. Aspheric components, however, cannot be adequately tested using spherical light beams. One alternative is to use a refractive or reflective null compensator to generate an aspheric test light beam, but such compensators are expensive and time consuming to produce and certify. Another alternative is to use a Computer Generated Hologram (CGH).

CGH null compensators are more easily produced, certified and, consequently, less expensive and easier to use in testing aspheric components than the above methods. A CGH null compensator is a type of diffractive optic element consisting of a binary fringe pattern defined lithographically on a photomask or other planar substrate. The fringe pattern may be of chrome on glass or else etched into the substrate, the latter providing a higher diffraction efficiency. CGH null compensators may be designed for operation having either light transmission or light reflection. CGH null compensators, however, are difficult to align in standard interferometers and usually require a custom built interferometer, while still introducing difficult alignment issues.

There is a need for an apparatus and method for adequately testing aspheric optical components using a conventional interferometer and removing difficult alignment problems of CGH null compensators, thus conserving resources and simplifying testing procedures.

SUMMARY OF THE INVENTION

The present invention is directed to an apparatus for aligning optical elements and a method that satisfies the need to adequately and easily test aspheric components using a conventional interferometer. The present invention uses CGH null compensators within the spherical test beam of a conventional interferometer, such as a Fizeau or Twyman-Green type interferometer. The alignment is simplified by use of interchangeable and prealigned releasable mounts.

The apparatus comprises an optical mount having a base and a mount plate for adjustably mounting an optical element. The mount plate is adjustable relative to the base and includes an assembly surface and several side surfaces. The base is attachable to a bench, table, rail, or the like. An optical element, such as a pre-aligned alignment CGH, is positioned within a first frame, which in turn is releasably coupled to the mount plate.

The interferometer generates a spherical test beam which is reflectively diffracted by the alignment CGH to create a nominally spherical and confocal return test beam. The mount plate is adjusted relative to the base such that the return test beam retraces its outgoing path to produce null interference fringes. The alignment CGH is then removed from the mount plate and a second optical element, such as a CGH null compensator affixed to a second frame, is releasably coupled to the mount plate in place of the alignment CGH, without adjusting the position of the mount plate, such that the spherical test beam from the interferometer is diffracted as it passes through the CGH null compensator to form a prescribed aspheric wavefront for testing aspheric components.

DETAILED DESCRIPTION OF THE PREFERRED EMBODIMENTS

Figure 1:
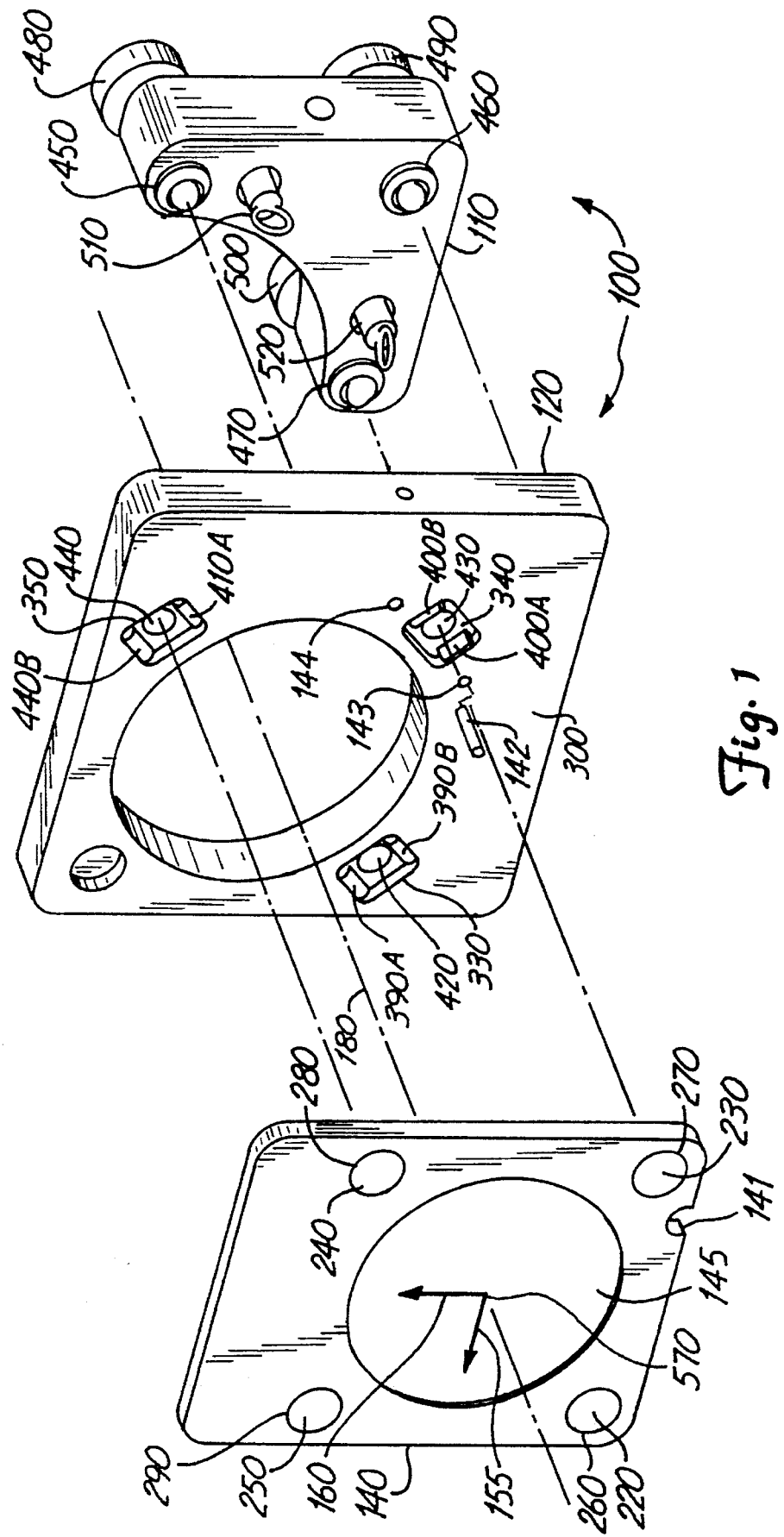
FIG. 1 is a perspective view of an apparatus embodying features of the present invention.

In FIG. 1, an optical mounting apparatus constructed in accordance with the principles of the present invention, called a three axis mount 100, is capable of tilt, tip and focus adjustments. The three axis mount 100 includes an optical element mount base 110 having a mount plate 120 adjustably attached to the mount base 110. An optical element frame 140 is releasably coupled to the mount plate 120, and thus to the optical element mount base 110. The frame 140 holds an optical element such as a CGH plate 145. The mount base 110 is capable of being attached to an optical table, rail, bench, or the like, which are not shown.

Figure 2:
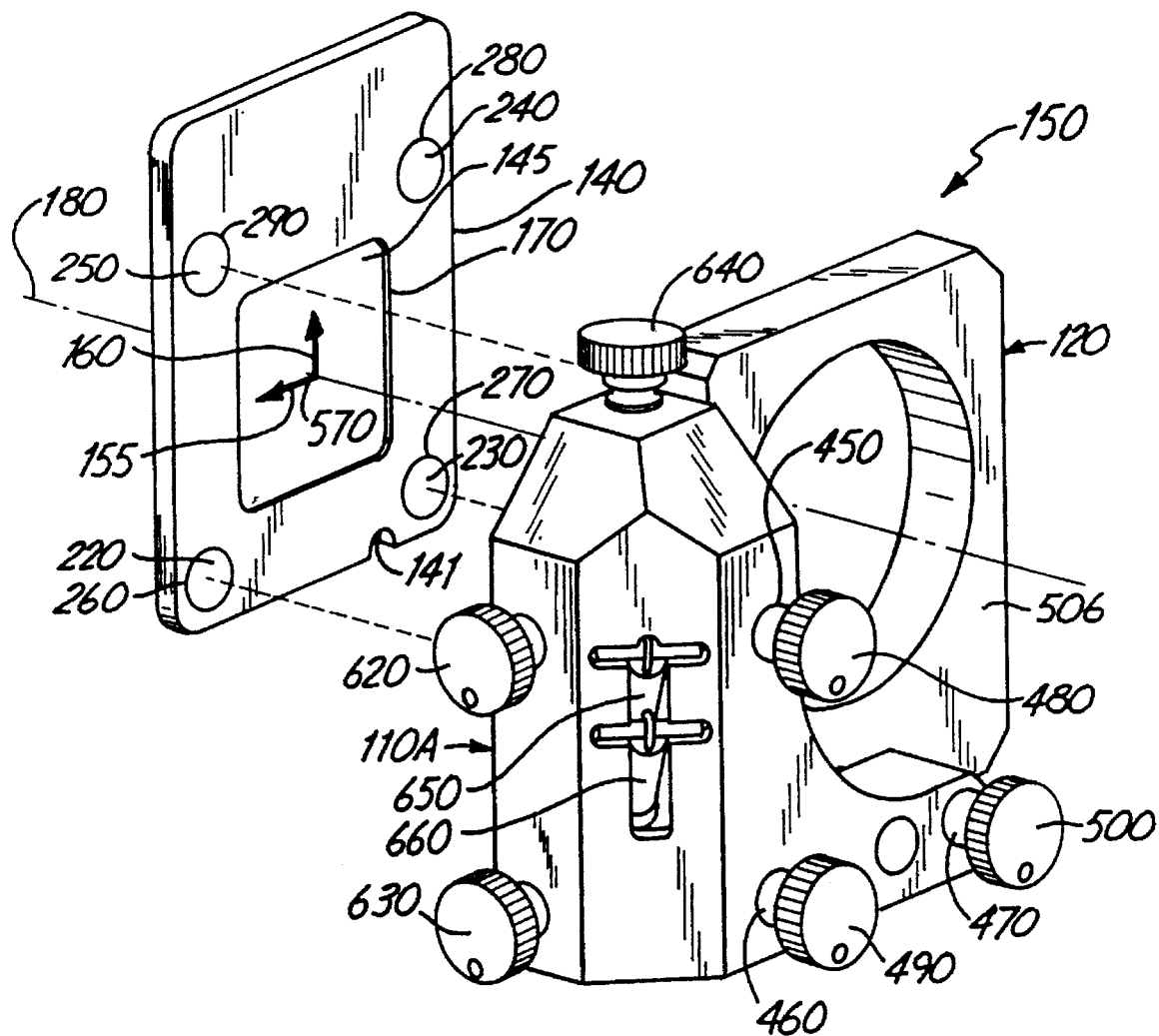
FIG. 2 is a perspective view of another apparatus embodying features of the present invention.

FIG. 2 shows a six axis mount 150 which is an optical mounting apparatus also constructed in accordance with the principles of the present invention, and, in addition to providing tilt, tip, and focus adjustments, is adjustable for vertical translation, horizontal translation, and rotation. Parts common to the three axis mount 100 and the six axis mount 150 are indicated by the same reference numbers. As in the three axis mount base 100, the six axis mount 150 includes an optical element mount base 110A having a mount plate 120 adjustably attached to the mount base 110A; and an optical element frame 140 releasably coupled to the mount plate 120. The frame 140 can hold an optical element such as a CGH plate 145. The mount base 110A is capable of being attached to an optical table, rail, bench, or the like.

Reference to horizontal and vertical directions will be made relative to the horizontal axis 155 and vertical axis 160 as set forth in FIGS. 1 and 2. Such references are made for convenience, however, and it will be appreciated that the plane of the three axis mount 100 or six axis mount 150 may be mounted in other than a vertical orientation, in which case the actual movement of the mount plate 120 will be made relative to a set of orthogonal axes at a selected reference orientation.

Figure 3:
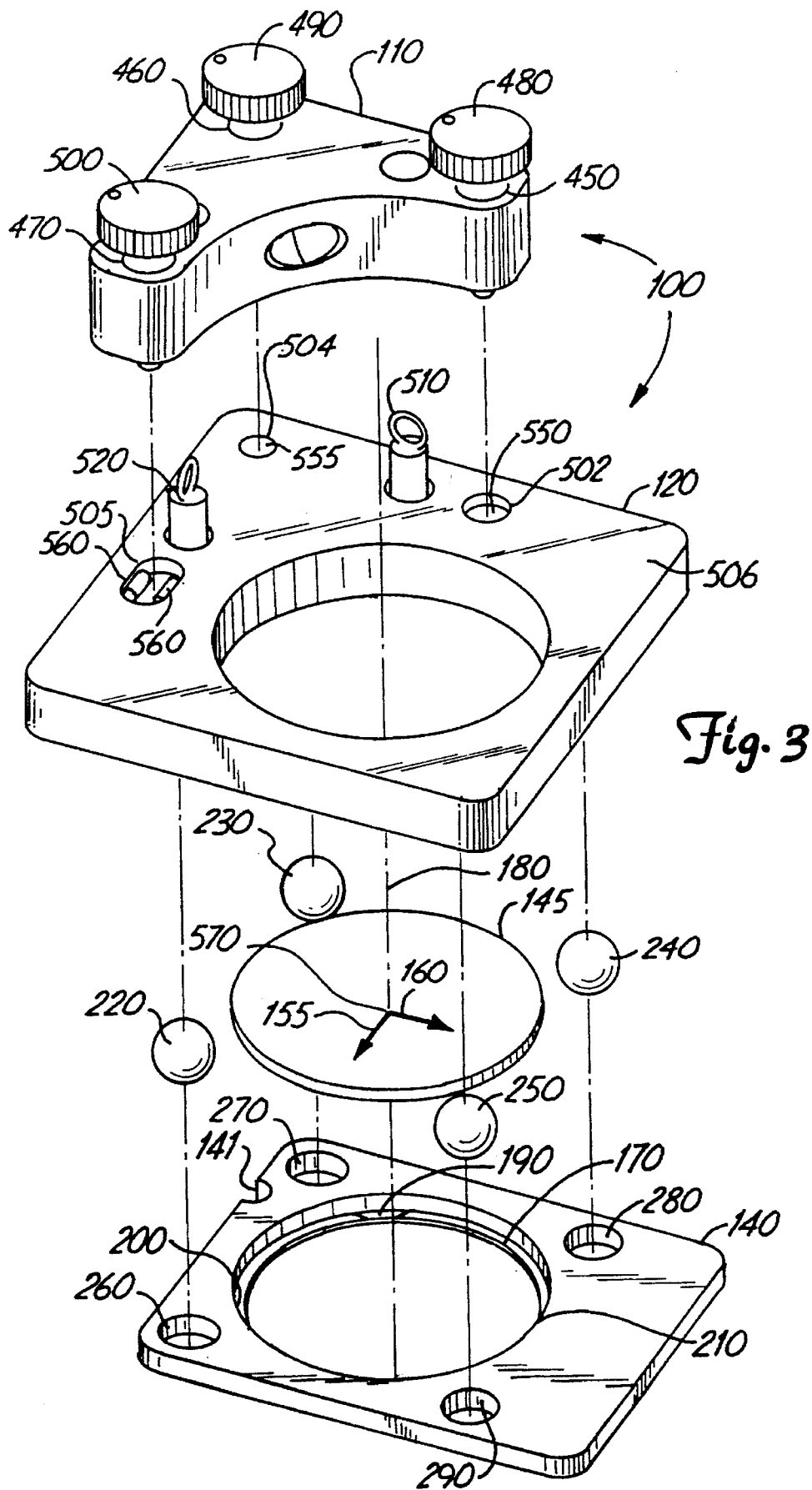
FIG. 3 is an exploded view of the apparatus of FIG. 1.
Figure 4:
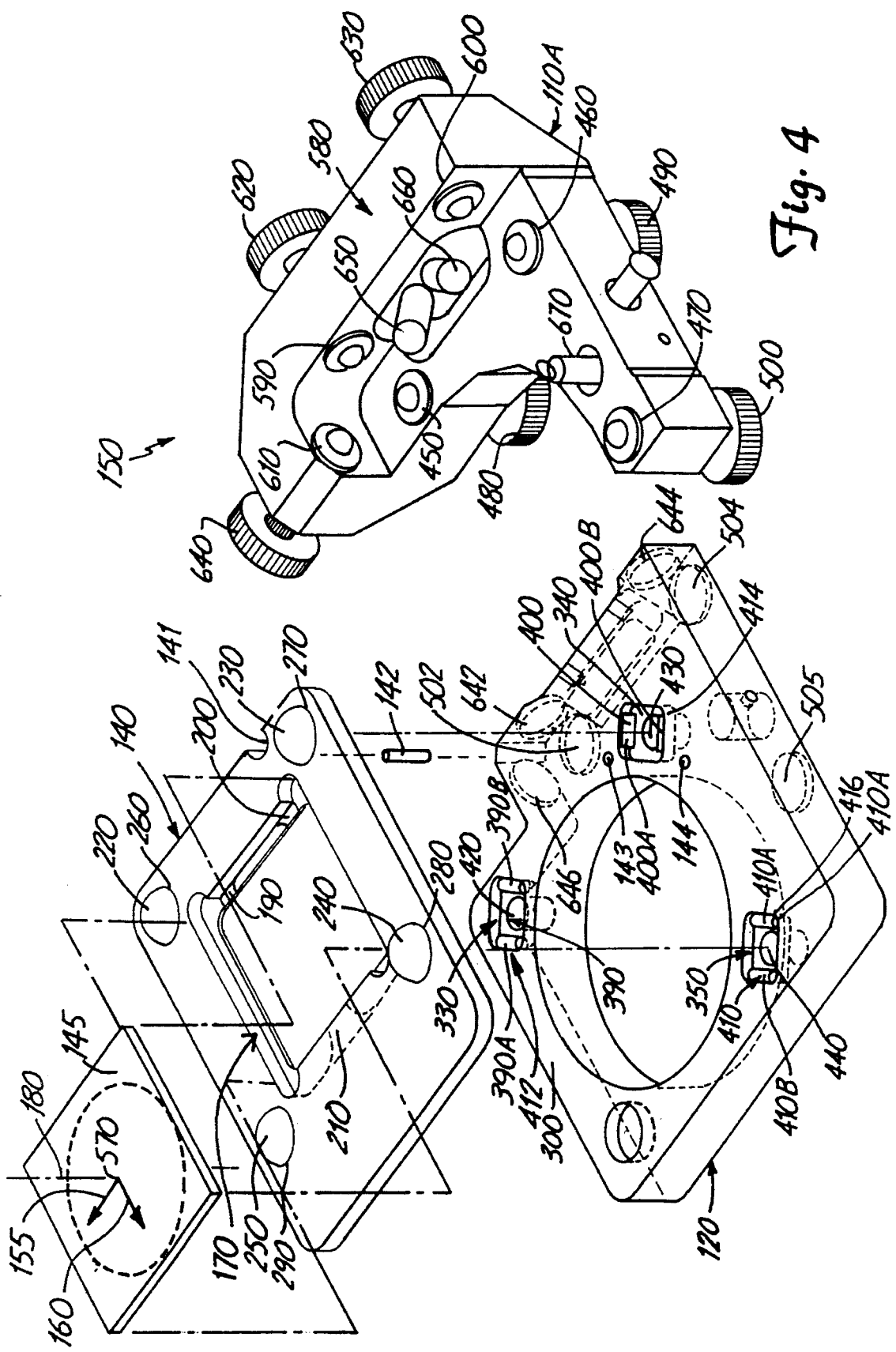
FIG. 4 is an exploded view of the apparatus of FIG. 2.

As seen in FIGS. 1, 3, and 4, the frame 140 includes an aperture 170 that has a central axis coincidental with the optic axis 180 of the CGH plate 145. The aperture 170 is illustrated as a circle in FIG. 3 and a rectangle in FIG. 4 bounded by shoulders, as shown, that are sized to permit the CGH plate 145 to rest down on three generally coplanar supports 190, 200, 210. The aperture 170 may be formed in a variety of other peripheral shapes and edge configurations that permit mounting of other desired optical elements such as mirrors, lenses, beam splitters, and the like on the frame 140.

As shown, four registration spheres 220, 230, 240 and 250 are mounted in through registration holes 260, 270, 280 and 290, respectively, formed in the frame 140 and preferably arranged at the corners of a square so as to permit attachment of frame 140 to mount plate 120 in any of four or eight discrete orientations. A notch 141 is provided in frame 140 to engage a pin 142 which may be removably attached to mount plate 120 at site 143 or 144 so as to enforce a preferred unique orientation of frame 140. The registration spheres 220, 230, 240 and 250 preferably are of greater diameter than the thickness of frame 140 and protrude outwardly from at least one side of the frame 140. The position of the registration spheres 220, 230, 240 and 250 in the respective registration holes 260, 270, 280 and 290 is precisely controlled to establish a prescribed parallelism and spacing between the plane defined by the supports 190, 200, and 210 and a plane tangent to the protruding ends of registration spheres 220, 230, 240 and 250. The registration spheres 220, 230, 240 and 250 then are secured in place within the registration holes 260, 270, 280 and 290 by adhesive bonding so the tangent plane of the spheres and the plane of the support surfaces 190, 200 and 210 remain parallel.

Preferably, two ends of each of the four registration spheres 220, 230, 240, and 250 protrude from opposite faces of the frame 140. Thus, there are two planes tangent to the ends of the registration spheres 220, 230, 240, and 250 where the planes are on each side of the frame 140. Preferably, the two planes of the registration sphere ends also will be parallel and equidistant to the plane of the support surfaces 190, 200, and 210.

The frame 140 is preferably constructed from a rigid material such as aluminum, steel, ceramic, or certain types of polymeric materials. The registration spheres 220, 230, 240 and 250 are preferably constructed from a hard and durable magnetic material such as hardened steel. The diameters of the registration spheres 220, 230, 240 and 250 are preferably identical. A minimum of three registration spheres 220, 230, 240 and 250 are provided on the frame 140.

The mount plate 120 comprises an assembly surface 300 and is formed to position and hold frame 140. The assembly surface 300 includes three recessed sites 330, 340, 350 positioned to receive three of the registration spheres 220, 230, 240 to support the frame in a known orientation on the mount plate 120. Each site 330, 340 and 350 receives one corresponding registration sphere 220, 230, 240, respectively. As shown, registration spheres 220, 230, and 240, are aligned with the respective recessed sites 330, 340 and 350.

Figure 5:
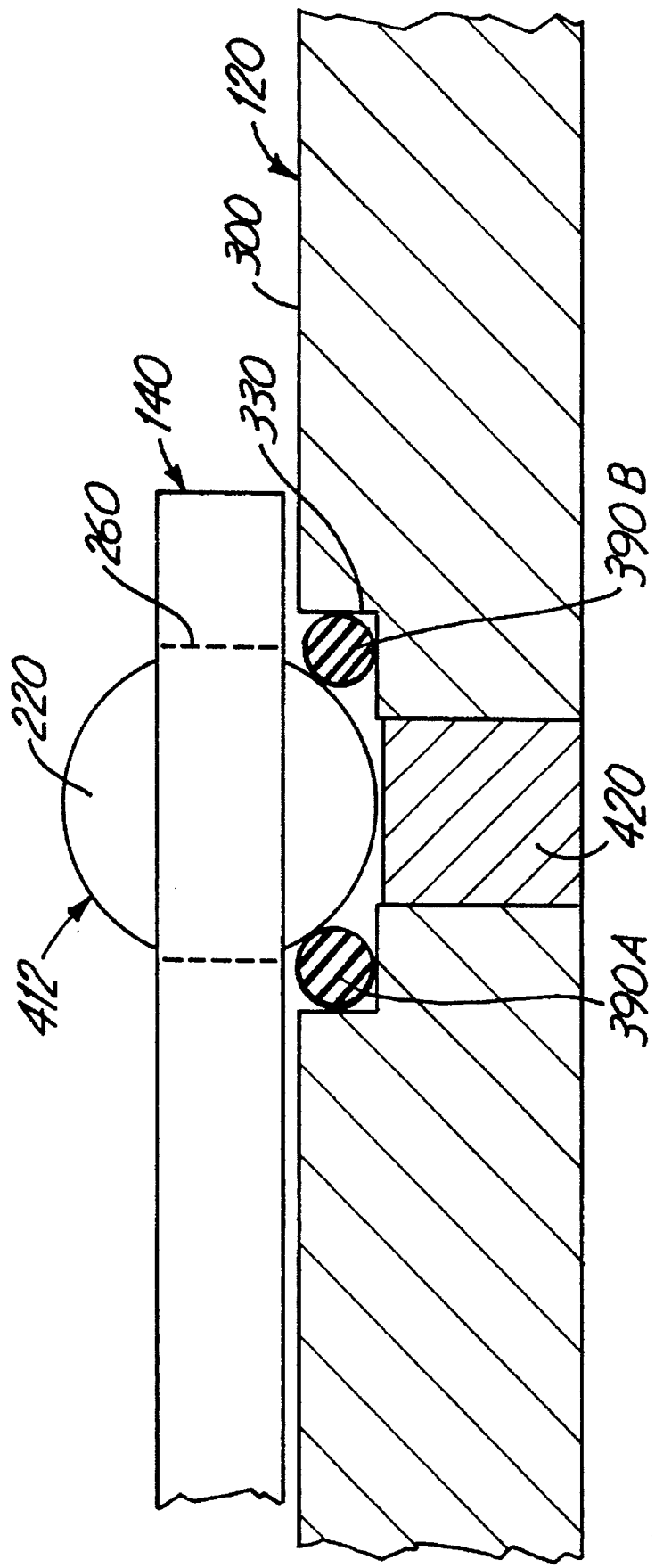
FIG. 5 is a cross-sectional elevation detail view of the apparatus of FIG. 1 and 2.

As also seen in FIG. 5, each site 330, 340, and 350 comprises a double mechanical constraint 390, 400, 410 for receiving and positioning the protruding ends of the corresponding registration spheres 220, 230, and 240, respectively. The registration spheres 220, 230 and 240 each seat on a pair of laterally spaced cylindrical rods 390A, 390B, 400A, 400B, 410A, 410B, respectively, forming the double mechanical constraints 390, 400, 410. The respective pairs of rods are spaced so the protruding ends of the registration spheres 220, 230, 240 seat on the rods before the lower surface of frame 140 touches assembly surface 300 and before the spheres 220, 230, 240 touch the magnets 420, 430, 440 so the frame 140 is supported at three points established by the three registration assemblies 412, 414, 416.

The axes of the rods 390A, 390B, 400A, 400B, 410A, 410B are parallel to a radial line bisecting the space between the respective rods. Further, the rods 390A and 390B preferably have axes substantially coincidental with the axes of rods 410A and 410B, respectively. The axes of rods 400A and 400B are preferably perpendicular to the axes of rods 390A, 390B, 410A, and 410B. The rods 390A, 390B, 400A, 400B, 410A, and 410B preferably are made from a hard, durable, and low friction material such as sapphire or carbide.

A separate magnet 420, 430, 440, is mounted in mount plate 120 at each registration site 330, 340, and 350 and is positioned aligned with the space between the rods at that site. The magnets can be of a rare earth material such as neodymium-boron-iron (NdFeB) or samarium cobalt (SmCo). When placed over the mount plate 120, the frame 140 is held on the mount plate by the magnetic force between the magnets 420, 430, 440 and the registration spheres 220, 230, 240, respectively, without additional fastening. The magnetic force is sufficient to hold the frame 140 securely, but is controlled so that when one frame 140 is pulled free from the mount plate 120 and another frame is attached, the alignment of the mount plate 120 identically configured will be maintained.

Easy and rapid interchangeability of optical elements with minimal degradation of system alignment is provided via the releasable coupling. The magnets 420, 430, 440 are attached within the mount plate 120 so as not to touch the registration spheres 220, 230, 240, respectively, when the frame 140 is coupled to the mount plate 120. The frame 140 and the registration spheres 220, 230, 240 are supported only by the respective pairs of rods at the registration sites 330, 340, 350. Further, the frame 140 can be coupled to the mount plate 120 in any of eight orientations.

The three axis optical element mount base 110 and the six axis optical element mount base 110A each include three threaded bores 450, 460, 470 in which first, second, and third adjustment screws 480, 490 and 500, respectively, are threaded. The adjustment screws are preferably precision ball-tipped type screws. The threaded bores 450, 460, 470 are preferably arranged at three corners of a square with the fourth corner coinciding with the optic axis 180. As illustrated, the optical element mount base 110 and 110A have an "L" shaped configuration with the threaded bores 450 and 470 located adjacent the ends of, and bore 460 at the junction between, the two legs of the "L". The optical element mount base 110, 110A could have a wide variety of other configurations, but the "L" shaped configuration is convenient because it avoids interference with the aperture 170 on the frame 140 where the optical element 145 is placed. The adjustment screws 480, 490, 500 engage the mount plate 120 at receptacles 502, 504, and 505, respectively, formed into the surface 506 of the mount plate 120 facing the optical element mount base 110, 110A.

Specific to the three axis mount 100, as seen in FIGS. 1 and 3, the mount plate 120 is held to the optical element mount base 110 by a pair of coil springs 510, 520 which are maintained under tension as mount plate 120 bears against the ends of screws 480, 490, and 500. A gap between the mount plate 120 and the mount base 110 is maintained by the adjustment screws 480, 490, 500. Preferably, the springs 510, 520 will be located so that the spring force on mount plate 120 is equally distributed between the three adjustment screws 480, 490, 500.

For the three axis mount 100, receptacle 502 has a flat surface disc seat 550, or "flat" therein. Receptacle 504 has a cone recess member 555 therein that permit rotation about a central axis or cone axis, which can be formed by three balls (not shown). Receptacle 505 has a "V" support, as shown, formed by two parallel rods 560. The flat 550, the cone 555, and the rods 560 provide the six mechanical constraints needed for operation. The flat 550 and rods 560 preferably are constructed from a durable, low friction material such as sapphire. The cone may be made of desired materials.

Specific to the six axis mount 150, the mount base 110A further comprises a flange 580 having three additional threaded bores 590, 600, 610 into which a first horizontal adjustment screw 620, a second horizontal adjustment screw 630, and a vertical adjustment screw 640, respectively, are threaded. The first horizontal adjustment screw 620 preferably coincides with the optic diameter line parallel to the horizontal axis 155 while a second horizontal screw 630 and a vertical screw 640 preferably have nominally identical moment arms about the optic axis 180. The horizontal and vertical adjustment screws 620, 630, 640 correspond with receptacles 642, 644, 646 which are formed in the mounting plate 120. For the six axis mount 150, the receptacles 502, 504, 505, 642, 644, 646 preferably each have flat disc seats, or "flats", supported therein and made from a durable, low friction material such as sapphire for low friction registration. The flats are substantially parallel and preferably coplanar.

Also, on the six axis mount 150, the mount plate 120 is held to the mount base 110A by one or more coil springs 650 and 660 attached to the mount base 110A and flange 580, and by a coil spring 670 attached to mount base 110A. Preferably, the coil springs 650, 660, and 670 will be located so that the force of the mount plate 120 is evenly distributed between the six adjustment screws 480, 490, 500, 620, 630, and 640.

On both the three axis mount 100 and the six axis mount 150, the optic axis 180 is located at a corner of a square which has its other three corners defined by the locations of the receptacles 502, 504, 505. A datum plane 570 is defined as including the center of the CGH plate 145, when attached to the frame 140, and is perpendicular to the optic axis 180. The datum plane 570 can be rotationally adjusted about both the horizontal axis 155 and the vertical axis 160.

In particular, the datum plane 570 can be rotated relative to the horizontal axis 155 by translating the second and third adjustment screws 490 and 500. Adjustment of the second and third screws 490, 500 to allow one end of the mount plate 120 to move closer to the adjacent surface of mount base 110 or 110A and causes the datum plane 570 to rotate in a first direction (pitch) while an adjustment that causes the one end of mount plate 120 to move away from the mount base 110 or 110A causes the datum plane 570 to rotate in the opposite direction. It is not necessary to adjust the first screw 480 in the three axis mount 100 or the other screws 480, 620, 630 and 640 for the six axis mount to prevent horizontal translation of the datum plane 570.

Rotation of the datum plane 570 about the vertical axis 160 may be achieved by the adjustment of the first and second screws 480, 490 without any adjustment to the third screw 500 in the three axis mount 100 or the other screws 500, 620, 630 and 640 for the six axis mount. Adjustment of the first, second and third screws 480, 490, 500 an equal amount results in pure focus translation of the datum plane 570 along the optic axis 180.

Additionally, on the six axis mount 150, turning the vertical screw 640 results in vertical translation of the datum plane 570. Turning the horizontal screws 620, 630 an equal amount results in pure horizontal translation of the datum plane 570. Turning the second horizontal screw 630 and vertical screw 640 results in pure rotation of the datum plane 570 about the optic axis 180.

Figure 6:
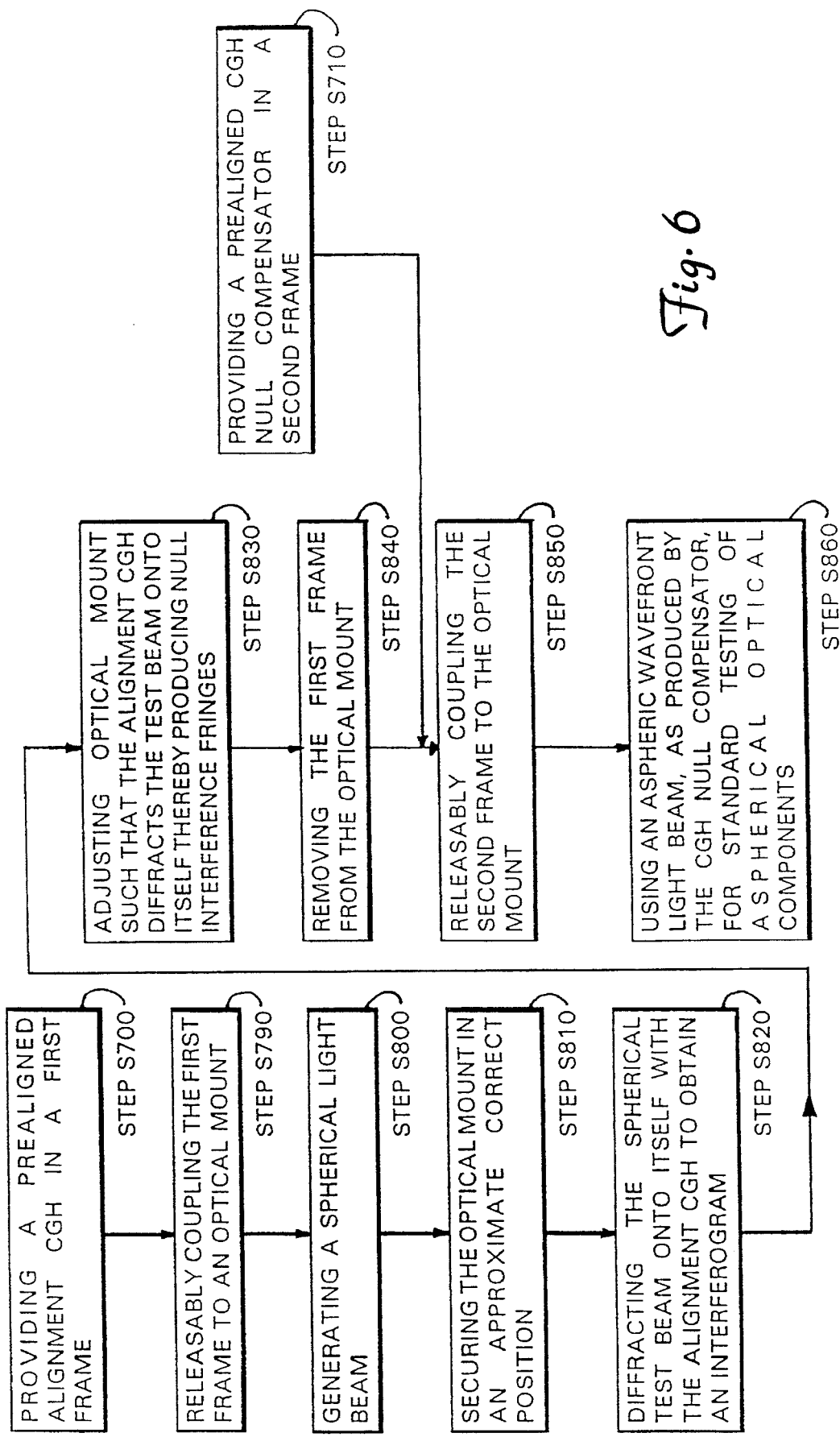
FIG. 6 is a flow chart of a method embodying features of the present invention.

To produce an aspherical wavefront with a spherical test light beam for testing aspherical optical components using the present invention, as shown in FIG. 6, a first frame is provided with a prealigned alignment CGH 700, and a second frame is provided with a CGH null compensator 710. The alignment CGH and the CGH null compensator are preferably permanently prealigned and bonded into their frames.

Figure 7:
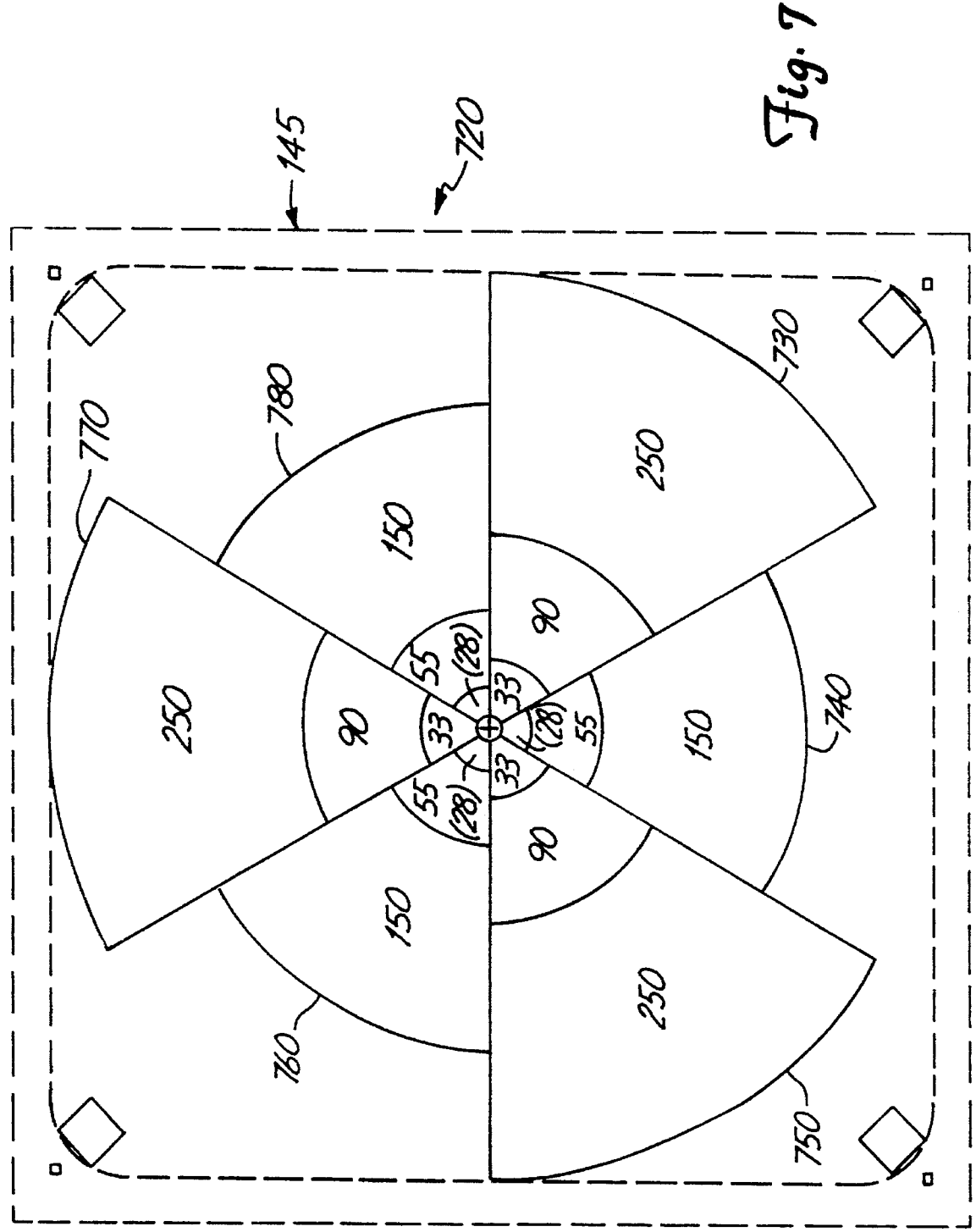
FIG. 7 is a schematic detail view of an alignment CGH used with the apparatus of the present invention.

The alignment CGH 700 shown in FIG. 7 is a reflective zone plate which diffracts a standard spherical test beam back onto itself to create a null interferogram when the center of the spherical test beam is on the axis of, and a prescribed focal distance from, the alignment CGH 700. The alignment CGH 700 can also be designed to produce a null interferogram when the spherical test beam is on an axis which is tilted with respect to the axis of the alignment CGH 700. The aperture of the alignment CGH, shown by reference numeral 720 in FIG. 7, may be partitioned such that a single alignment CGH can be designed to function at several discrete focal distances, tilt angles, or both. A preferred partitioning of the alignment CGH consists of pie-shaped segments, three for each discrete focal distance distributed symmetrically about the optic axis 180. For example, segments 730, 750, 770 correspond with a focal distance of 250 mm and segments 740, 760 and 780 correspond with a focal distance of 150 mm. Focal distances of 90 mm, 55 mm, 33 mm and 28 mm are represented in FIG. 7.

In FIG. 6, the process steps are shown by a series of blocks representing steps of the process and are indicated by reference numerals with the prefix "S". The alignment CGH 700 is releasably mounted to the mount plate as indicated by block S790. A conventional interferometer produces a spherical test beam which may be diffracted back along its path by the alignment reflection CGH S800. To determine the specific position of the mount with respect to a surface, the mount is secured to the surface in an approximately correct position as the next step S810. Then, the spherical test beam is diffracted back along its path by the alignment CGH S820, producing null interference fringes. Next, as indicated at block S830 the screws are adjusted to remove tilt and focus fringes of the resulting diffraction of the spherical test beam. In such case the test beam will be diffracted back onto itself producing null interference fringes. The alignment CGH is removed from the mount plate as indicated at S840 and replaced with the custom CGH null compensator as shown by block S850. The spherical test beam from the interferometer is thus diffracted to produce an aspheric wavefront light beam for standard testing of aspherical optical components as represented by block S860. Upon being returned by the test optic, the aspheric test beam is again diffracted by the CGH null compensator to product a spherical test beam as required by the interferometer.

After an alignment CGH is installed, the mounting plate can be quickly and precisely aligned with respect to a spherical test beam by the method most familiar to interferometer users: adjusting the screws to null a fringe pattern.

Because the CGH null compensator and the alignment CGH are prealigned in a kinematically mounted frame, the alignment is readily transferred to a custom CGH null compensator.

Also, because the custom CGH null compensator is located in a spherical test beam external to the interferometer, its optical design can be easily understood and verified by the user. No detailed knowledge of the interferometer optics or modification of the interferometer hardware is required. Consistency of CGH prealignment and transmitted wavefront distortion of the CGH substrate are verifiable by the user with reasonable effort and no special equipment.

Although the present invention has been described with reference to preferred embodiments, workers skilled in the art will recognize that changes may be made in form and detail without departing from the spirit and scope of the invention.

What is claimed is:

1. An apparatus suitable for adjustably mounting an optical element, the apparatus comprising:
   a mount having a base; a mount plate including first and second side surfaces; means for securing the mount plate to the base at a known relation thereto; and adjusting means for adjusting the orientation of the mount plate relative to the base;
   a generally planar frame suitable for supporting an optical element; and
   a coupling means for releasably and directly coupling the frame to the mount plate at a known orientation thereto for supporting a second frame for a second optical element in the same alignment as a first frame for a first optical element after the first frame has been released from its coupling to the mount plate wherein one of the frame and the mount plate includes three registration members, each having a part spherical surface, and the other of the frame and the mount plate includes three mechanical constraints registration members, the mechanical constraints including a recessed site having a magnet therein providing a force to urge the registration members to seat on the mechanical constraints.

2. The apparatus of claim 1 wherein the frame includes a central aperture for mounting the optical element and three supports attached to the frame proximate the perimeter of the aperture.

3. The apparatus of claim 1 wherein the frame includes a registration hole, a registration member positioned in each hole, and means for securing the registration members to the frame with the part spherical surfaces protruding from the frame at known distance therefrom.

4. The apparatus of claim 1 wherein the frame comprises four registration holes, each registration hole having a registration sphere wherein the registration spheres protrude from the frame at a known distance therefrom, wherein the registration holes are arranged at the corners of a square for permitting attachment of the frame to the mount in any of four orientations.

5. The apparatus of claim 1 wherein the frame comprises four registration holes, each registration hole having a registration sphere wherein the registration spheres protrude from the frame at known distances from opposite sides of the frame such that planes on opposite sides of the frame and tangent the registration spheres are substantially parallel, wherein the registration holes are arranged at the corners of a square for permitting attachment of the frame to the mount in any of eight orientations.

6. An apparatus suitable for adjustably mounting an optical element, the apparatus comprising;
   a mount having a base; a mount plate including first and second side surfaces; means for securing the mount plate to the base at a known relation thereto; and adjusting means for adjusting the orientation of the mount plate relative to the base;
   a generally planar frame suitable for supporting an optical element; and
   coupling means for releasably coupling the frame to the mount paste at a known orientation thereto for supporting a second frame for a second optical element in the same alignment as a first frame for a first optical element after the first frame has been released from its coupling to the mount plate wherein the coupling means comprises three, spaced-apart registration assemblies, each registration assembly having:
      a registration sphere rigidly attached to the frame; and
      a registration site attached to the mount plate, the registration site suitable for directly mating with the registration sphere, the registration site including:
         a mechanical constraint suitable for mating with the registration sphere; and
         a magnet attached to the frame proximate the mechanical constraint, the magnet providing magnetic attraction with the registration sphere such that the frame is releasably coupled to the mount plate when the registration spheres are mated with the mechanical constraints.

7. The apparatus of claim 6 wherein the mechanical constraint comprises two spaced, parallel cylindrical rods.

8. The apparatus of claim 7 wherein the magnet is positioned between the rods and so as to leave a space between the magnet and the registration sphere when the frame is releasably coupled to the mount plate.

9. The apparatus of claim 8 wherein the rods are made from a hard, durable, and low friction material.

10. The apparatus of claim 9 wherein the material is selected from the group consisting of carbide and sapphire.

11. The apparatus of claim 6 wherein the adjusting means comprises a first set of three spaced apart adjustment assemblies, each adjustment assembly comprising:
   a receptacle formed in one of the mount plate and the base;
   an adjustment screw threadably mounted in the other of the mount plate and the base and positioned to engage the mount plate at the receptacle such that the orientation of the mount plate relative to the base may be independently adjusted by each adjustment assembly.

12. The apparatus of claim 11 wherein the first receptacle comprises an effective cone; the second receptacle comprises a flat surface; and third receptacle comprises two spaced-apart parallel rods, wherein the receptacles impose mechanical constraints upon movement of the mount plate.

13. The apparatus of claim 11 wherein the securing means comprises a spring attached to and between the base and mount plate, the spring yieldably urging the base and mount plate together in a generally parallel orientation.

14. The apparatus of claim 11 wherein the base further comprises a flange attached to the base and the adjusting means further comprises a second set of three spaced apart adjustment assemblies arranged in the plane of the mount plate, the second set of adjustment assemblies having:
   a fourth receptacle positioned on the mount plate at the first side surface;
   a fourth adjustment screw threadably mounted in the flange and positioned to engage the mount plate at the fourth receptacle;

a fifth receptacle positioned on the mount plate at the first side surface;

a fifth adjustment screw threadably mounted in the flange and positioned to engage the mount plate at the fifth receptacle;

a sixth receptacle positioned on the mount plate at the second side surface; and a sixth adjustment screw threadably mounted in the flange and positioned to engage the mount plate at the sixth receptacle such that the orientation of the mount plate relative to the base may be independently adjusted by each of the six adjustment assemblies.

15. The apparatus of claim 14 wherein the fourth adjustment screw coincides with the optic axis and the fifth and sixth adjustment screws have nominally identical moment arms about the optic axis.

16. The apparatus of claim 14 wherein the securing means comprises:

a base spring attached to and between the base and the mount plate;

a first flange spring with one end attached to the base near the flange, and the other end attached to the mount plate; and a second flange spring with one end attached to the base near the flange and the other end attached to the mount plate such that the base spring and the flange spring yieldably urge the mount plate against all six adjustment screws and hold the base and mount plate together in a generally parallel orientation.

17. A method for testing aspheric optical components with a spherical test beam from an interferometer, the method comprising the steps of:

providing a prealigned alignment CGH on a first frame;

providing a prealigned CGH null compensator on a second frame;

providing an apparatus suitable for adjustably mounting an optical element, the apparatus comprising:

a mount having a base; mount means for removably securing the mount plate to the base at a known relation thereto; including means for adjusting the orientation of the mount plate relative to the base; and a coupling means for releasably and directly coupling the frames to the mount plate at a known orientation the frame includes three registration members, each having a part spherical surface, and the mount plate includes three mechanical constraints for receiving the registration members, the mechanical constraints including a recessed site having a magnet therein providing a force to urge the registration members to seat on the mechanical constraints;

generating a spherical test beam from the interferometer;

coupling the alignment CGH to the apparatus;

diffracting the spherical test beam with the alignment CGH to obtain an interferogram;

adjusting the mount plate such that the alignment CGH diffracts the test beam onto itself, thereby producing null interference fringes;

removing the alignment CGH from the apparatus; and coupling the CGH null compensator to the apparatus such that the spherical test beam is diffracted to form an aspheric wavefront for standard testing of the aspheric components.

18. The method of claim 17 wherein the step of coupling the alignment CGH to the apparatus comprises releasably coupling the alignment CGH to the apparatus.

19. The method of claim 17 wherein the step of attaching the CGH null compensator to the apparatus comprises releasably coupling the CGH null compensator to the apparatus.

20. A device for mounting an optical element, the device comprising:

generally planar frame having a planar support for supporting the optical element; and a coupling means attached to the frame for releasably coupling the frame to an optical mount such that removing the frame from the optical mount does not substantially degrade alignment of the optical mount wherein the frame further includes three registration members, each having a part spherical surface and the coupling means includes three mechanical constraints on the optical mount for receiving the part spherical surfaces, and a magnet providing a force to urge the registration members to seat on the mechanical constraints.

21. The device of claim 20, wherein the frame includes three registration holes, a registration member positioned in each hole, and means for securing the registration members to the frame with the part spherical surfaces protruding from the frame at a known distance therefrom.

22. The device of claim 20, wherein the frame has a central aperture and at least three spaced-apart registration holes between the aperture and a peripheral edge of the frame.

23. The device of claim 22, wherein the at least three registration spheres are affixed to the frame and within the registration holes wherein each registration sphere has two protruding ends such that the planes tangent to the ends are parallel and equidistant to the planar support.

24. The device of claim 22, wherein the frame further includes at least three spaced support surfaces defining a plane for supporting the optical element, the support surfaces being positioned proximate the aperture.

25. The device of claim 20 wherein the coupling comprises at least three registration spheres affixed to each side of the frame with portions of the spheres protruding from the frame for engagement with the optical mount such that the planes tangent to the ends are parallel and equidistant to the planar support.

26. The device of claim 20 wherein the optical mount comprises:

a base;

a mount plate;

means for securing the mount plate to the base at a known relation thereto;

means for adjusting the orientation of the mount plate relative to the base; and wherein the frame includes a fourth registration member; and wherein the frame comprises four registration holes, each registration hole having one of the registration spheres wherein the registration spheres protrude from the frame at a known distance therefrom, wherein the registration holes are arranged at the corners of a square for permitting attachment of the frame to the mount plate in any of four orientations.

27. The device of claim 26 wherein the registration spheres protrude from the frame at known distances from opposite sides of the frame such that planes on opposite sides of the frame and tangent the registration spheres are substantially parallel, wherein the registration holes are arranged at the corners of a square for permitting attachment of the frame to the mount plate in any of eight orientations.

* * * * *